(12) United States Patent
Höfling

(10) Patent No.: US 6,324,857 B1
(45) Date of Patent: Dec. 4, 2001

(54) LABORATORY THERMOSTAT

(75) Inventor: Uwe Höfling, Ettenheim (DE)

(73) Assignee: Julabo Labortechnik GmbH, Seelbach (DE)

( * ) Notice: Subject to any disclaimer, the term of this patent is extended or adjusted under 35 U.S.C. 154(b) by 0 days.

(21) Appl. No.: 09/451,990

(22) Filed: Nov. 30, 1999

(30) Foreign Application Priority Data

Dec. 1, 1998 (DE) .............................................. 198 55 398
Oct. 30, 1999 (DE) .............................................. 199 52 349

(51) Int. Cl.[7] .......................... G05D 23/30; F25D 17/02
(52) U.S. Cl. ................................... 62/202; 62/98; 62/225
(58) Field of Search ............................ 62/225, 202, 98; 236/68 C, 68 A

(56) References Cited

U.S. PATENT DOCUMENTS 2,534,455 * 12/1950 Koontz ................................... 62/202
4,879,879 * 11/1989 Marsala et al. ........................ 62/225
5,195,331 * 3/1993 Zimmern ............................... 62/202

FOREIGN PATENT DOCUMENTS

3818321 A1 12/1989 (DE) .

* cited by examiner

Primary Examiner—William Wayner
(74) Attorney, Agent, or Firm—Akin, Gump, Strauss, Hauer & Feld, L.L.P.

(57) ABSTRACT

A laboratory thermostat (1) has a bath container (2) for liquid (3) to be tempered as well as a heating device and a refrigerating unit (4). The refrigerating cycle of the refrigerating unit (4) has a compressor (5), a condenser (6), an evaporator (8), as well as an expansion valve (7) controlled by a temperature sensor (10) arranged at the evaporator outlet. In addition, a regulation device (11) is also provided which is connected to a temperature actual value sensor (12) for recording the bath temperature. So that the temperature of the bath liquid can be adjusted to various values and regulated, the temperature sensor (10) of the expansion valve (7) is in thermal contact with a tempering apparatus controlled by the regulating device (11). The extent of the tempering is determined by the regulation device (11) according to the adjusted bath temperature output and the bath temperature measured by the temperature actual value sensor. In addition, to increase the regulation dynamics, the temperature sensor (10) of the expansion valve (7) is in thermal contact with a refrigerating device (15).

13 Claims, 3 Drawing Sheets

LABORATORY THERMOSTAT

BACKGROUND OF THE INVENTION

The invention involves a laboratory thermostat having a bath container for a liquid to be tempered as well as a refrigerating unit, wherein the refrigerating unit has a refrigeration cycle having a compressor, a condenser, an evaporator, as well as a mass flow regulator (expansion valve) controlled by a temperature sensor arranged at the outlet of the evaporator, and having a regulation device that is connected to a temperature value sensor for detecting the bath temperature, and, if necessary, having a heating unit for the bath liquid.

In laboratory thermostats of this type cost-effective membrane valves, which are also called thermostatic expansion valves, can be used as the expansion valve. A liquid thermometer, which is arranged at the outlet of the evaporator and measures the temperature in the refrigerant there, generally functions for controlling the membrane valve. Depending on the temperature difference between the intake and outlet of the evaporator, the mass flow is changed in such a way that the evaporator outputs its optimal refrigerating capacity. The temperature of the intake is indirectly measured by the pressure.

Using the thermostatic expansion valve, the refrigerating capacity is thus adapted to the actual requirements and limited accordingly. In order to achieve a thermostatic regulation of the liquids to be tempered in the bath container, i.e., keeping a constant liquid temperature previously set in the regulation device, it is known according to German published patent application DE 38 18 321 A1 to provide, in addition to the output limiter-expansion valve, a hot gas-bypass valve, which is in controlling connection with the regulation device. The bypass valve, which can be magnetically opened or closed, is inserted into a bypass line, which is connected on one end after the compressor and before the condenser and on the other end after the expansion valve and before the evaporator. Thus, the hot refrigerant gas flows through the evaporator when the hot gas-bypass valve is open. In this case, there will be no cooling. For regulation of the temperature of the bath liquid, the bypass valve is opened and closed at appropriate time intervals.

It is disadvantageous therein that the refrigeration capacity is not continuously available, but instead is switched between 0% and 100%. If a high regulation accuracy is necessary with this two point regulation, then to smooth out the temperature fluctuations, the bath volume must be large or the switching intervals must be done at shorter time intervals, which, however, greatly reduces the lifetime of the solenoid valve. Furthermore, during the switching operation large pressure jolts occur in the refrigeration cycle, which strain the components of the refrigeration cycle and can lead to a breakdown of these components, especially the expansion valve with a membrane.

SUMMARY OF THE INVENTION

An object of the present invention is to create a laboratory thermostat of the type mentioned at the outset, which allows at low cost a practically continuous regulation of the refrigerant flow and thus maintenance of a constant bath temperature with high regulation accuracy. A stressing of the components belonging to the refrigerant cycle by the regulation should be avoided, and thus a disturbance-free operation over longer operating time periods should also possible.

In order to achieve this objective, it is proposed that the temperature sensor for the expansion valve be in thermal contact with a heating unit belonging to a tempering apparatus and controlled by the regulation device, to increase the refrigerating capacity of the refrigerating unit when the actual value of the bath liquid temperature measured by the temperature actual value sensor is higher than the bath target value temperature and, on the other hand, to reduce the refrigerating capacity when the actual value of the bath liquid temperature measured by the temperature actual value sensor is lower than the bath target value temperature, on the one hand by heating of the temperature sensor and on the other hand by cooling it off.

In this way, the temperature base level of the temperature sensor for the expansion valve can be varied, and thus the temperature of the bath liquid can be adjusted and regulated to various values. The temperature measured by the temperature sensor is thus not only a function of the temperature of the refrigerant after the evaporator, but also a function of the temperature output by the heating unit controlled by the regulation device. The extent of the heating by the heating unit is determined by the regulation device according to the adjusted bath temperature output and the bath temperature measured by the temperature actual value sensor.

For this regulation a bypass valve, having the aforementioned disadvantages resulting from it, is no longer necessary. Servo-controlled expansion valves are of course known, which control the refrigerant flow by constantly changing a nozzle based on the control of the regulation device. However, such an arrangement entails a considerable cost, which is occasioned by the parts necessary for it, namely the expansion valve itself, a step motor having electronic control, as well as a spindle drive.

With the present invention an available expansion valve, in particular a simple membrane valve, can continue to be used, which is preferably connected to the temperature sensor constructed as a liquid thermometer, via a control line constructed as a tube for the control medium.

In this case, the costs for the continuous control of necessary components can be reduced with the inventive subject matter to approximately one-third of the costs of a servo-controlled expansion valve.

Another independent solution of the objective of the invention is given wherein the temperature sensor, thermally coupled to the tempering apparatus, can be positioned at any location desired, thus even independent from a line to the evaporator outlet.

An additional advantageous embodiment of the invention provides that the tempering apparatus in thermal contact with the temperature sensor of the expansion valve has a refrigerating device in addition to the heating unit. In this way, an increase in the control dynamics is achieved, because a quicker heat discharge is possible in the area of the temperature sensor.

Preferably it is provided that the refrigerating device of the tempering apparatus is connected to the refrigeration cycle of the refrigerating device. In this way, the expense for the refrigeration device is extremely small, since it is possible to fall back on the available main refrigerating flow cycle.

It is advantageous therein, if the refrigerating device connected to the refrigerating cycle of the refrigerating unit is connected via a capillary tube, connected in particular prior to the expansion valve to the refrigerating cycle of the refrigerating unit, that on the other end of the capillary tube an evaporator is connected, which is in thermal contact with the temperature sensor, and that the evaporator of the refrigerating device is connected via a refrigerant return to the refrigerant line between the evaporator and the compressor of the refrigeration cycle.

The refrigeration is accomplished continuously hereby, and the tempering of the temperature sensor to a certain temperature value is achieved, if necessary, by counter-heating using the heating unit. Since the heating and refrigeration output necessary for tempering the temperature sensor is small, even with the counter-heating only very small losses result, which are practically of no consequence.

It is advantageous if the temperature sensor is in thermal contact with both the refrigerating device and the refrigerant line of the refrigeration cycle between the evaporator and the compressor. In this way, a fundamental tempering of the temperature sensor by the available refrigerant line is present, and when the heating unit breaks down, a tempering of the bath liquid remains, which is indeed unregulated but limited, as in the previously known devices.

In this context it should be mentioned that the arrangement of the refrigerating device and the heating unit is indeed preferably provided on the refrigerant line, because in this way the previous arrangement can be maintained, and the previously mentioned advantages are present, but an arrangement offset from the refrigerant line is also possible.

Another embodiment of a tempering apparatus for the temperature sensor provides that the refrigerating device and/or the heating unit is formed by at least one Peltier element. When using a Peltier element, this can be used both for refrigerating and for heating the temperature sensor.

It is also advantageous herein that the refrigerating and heating of the temperature sensor 10 is alternatingly controlled by the regulation device.

With a Peltier element available laboratory thermostats, especially those operating with a thermal expansion valve for limiting the output, can be retrofit in an especially easy manner into a laboratory thermostat that is regulated and operates at a high regulation accuracy.

BRIEF DESCRIPTION OF THE SEVERAL VIEWS OF THE DRAWINGS

Additional embodiments are set forth in the additional dependent claims. In the following, the invention is further explained with its essential details based on the drawings.

Shown are.

DETAILED DESCRIPTION OF THE INVENTION

Figure 1:
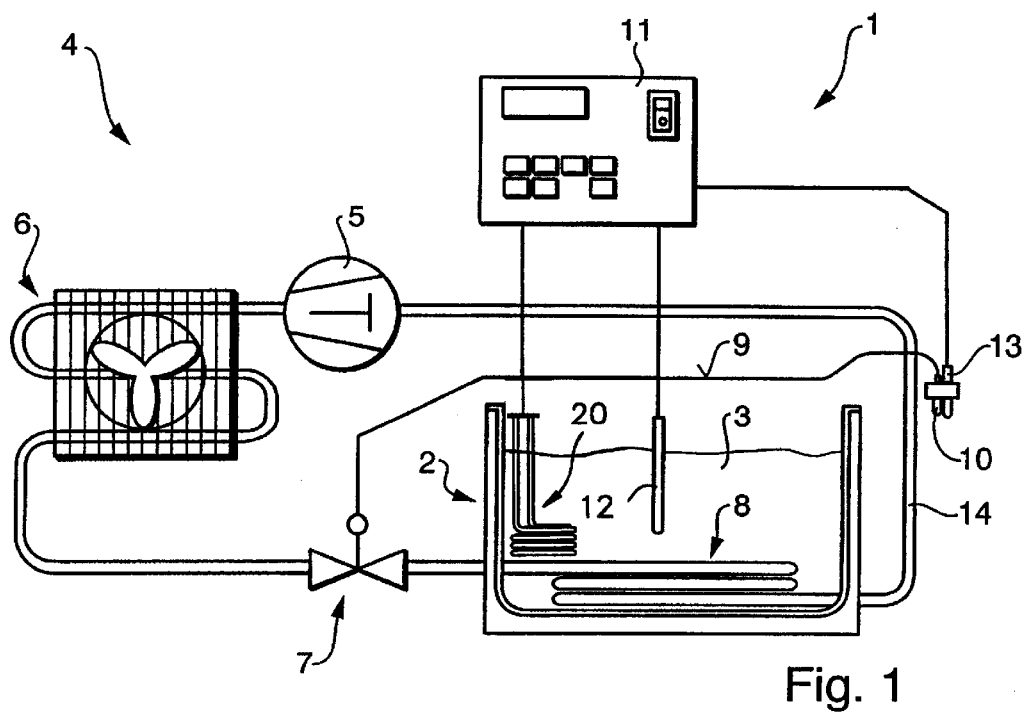
FIG. 1 shows a laboratory thermostat with a refrigeration cycle and regulation device.
Figure 2:
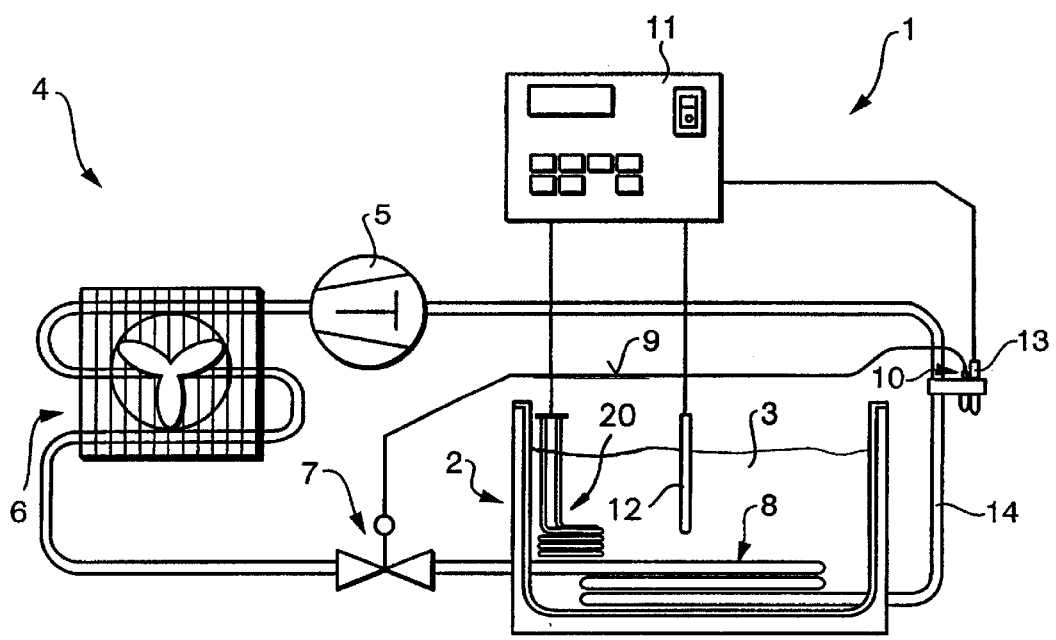
FIG. 2 shows a laboratory thermostat with a refrigeration cycle according to FIG. 1, but here having a temperature sensor arranged on the evaporator outlet.
Figure 3:
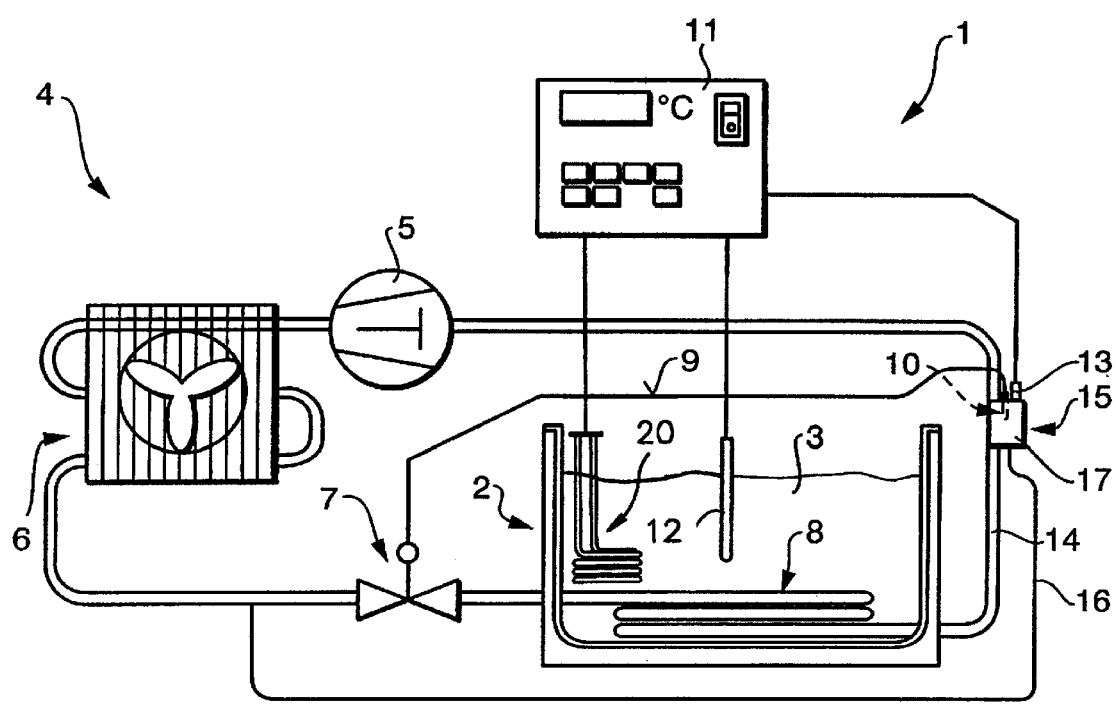
FIG. 3 shows a laboratory thermostat with a refrigeration cycle according to FIG. 2, but here additionally having a refrigerating device for the temperature sensor.

A laboratory thermostat 1 shown in FIGS. 1 to 3 has a bath container 2 for liquid 3 to be tempered. Using a refrigerating unit, indicated as a whole by 4, the liquid 3 in the bath container can be cooled and can be heated with a heating device 20. The refrigerating unit 4 has a refrigeration cycle with a compressor 5, a condenser 6, an expansion valve 7, and an evaporator 8.

The expansion valve 7 is preferably constructed as a membrane valve, whose degree of opening is a function of the position of the membrane. The membrane expansion valve 7 stands in connection with a temperature sensor 10, constructed in particular as a liquid thermometer, via a control line 9, constructed as a tube. Using the liquid, which becomes more or less expanded during the temperature changes, the membrane of the expansion valve 7 is controlled directly by the control line 9. At a lower measurement temperature, the penetration of refrigerant through the expansion valve 7 is reduced, while at higher temperatures the expansion valve 7 is opened further.

FIG. 2 shows an embodiment in which the temperature sensor 10 is thermally coupled on the outside to the refrigerant line 14 that leads away from the evaporator 8. Depending on the temperature of the refrigerant coming from the evaporator 8, the mass flow through the expansion valve 7 controlled by the temperature sensor 10 is varied.

Using this control circuit, the refrigerating capacity output via the evaporator 8 is thus adapted to the actual demand, so that even with reduced heating of the refrigerant by the liquid 3, i.e., when the difference between the refrigerant temperature and the temperature of the bath liquid is small, a refrigerating capacity limitation results.

In order to temper the liquid 3 located in the bath container 2 to an adjustable value, an overriding regulation device 11, which is connected to a temperature value sensor 12 which records the temperature of the liquid 3 in the bath container, intervenes in the aforementioned control circuit. Based on the measured temperature actual values and a target temperature entered in the regulation device 11, the measurement temperature or the surrounding temperature of the temperature sensor 10 is varied for this purpose.

This is accomplished using a heating unit 13 controlled by the regulation device, which is in thermal contact with the temperature sensor 10. If, for example, a reduction of the temperature of the liquid 3 located in the bath container 2 to a value below the instantaneous actual value is desired, then the temperature sensor 10 (see also FIG. 2) is heated somewhat using the heating unit 13. The temperature sensor 10 further controls by its heating the expansion valve 7, so that the output refrigeration capacity is correspondingly increased via the evaporator 8. If the temperature of the liquid 3 measured by the temperature actual value sensor 12 reaches the predetermined target value, then the heating output of the heating unit 13 is at least reduced until the actual temperature value practically corresponds to the target temperature value.

As shown in FIG. 1, the temperature sensor 10 can also be connected exclusively to the heating unit 13 connected to the regulation device 11, in order to keep the bath temperature constant. In this case, the regulation quantity controlling the expansion valve 7 is only influenced by the heating unit 13, in that this heating unit is activated as a function of the temperature target value and temperature actual value of the bath liquid.

In this embodiment, it can be advantageous if a higher temperature level is worked with compared to the surrounding air at the temperature sensor 10, in order to have available a sufficient temperature drop for cooling off the temperature sensor 10 compared to the surrounding air.

The embodiment according to FIGS. 2 and 3, where a thermal coupling of the temperature sensor 10 to the outside of the refrigerant line 14 leading away from the evaporator 8 is provided, has the advantage that even upon the breakdown of the one control circuit controlled by the regulation device 11, at least a refrigerating capacity limitation is still accomplished via the other control circuit. In this preferred arrangement, where the temperature sensor 10 is connected to the refrigerant line 14 between the evaporator 8 and the compressor 5, in particular close to the evaporator outlet, the temperature sensor can be cooled off comparatively quickly, when higher temperatures of the liquid 3 are to be reached. It is to be observed here, however, that the cooling by the refrigerant line 14 is subject to large fluctuations and under certain circumstances is ineffective, for the case that a high heat absorption by the liquid 3 results through the evaporator 8 at correspondingly high temperature differences.

Therefore, a refrigerating device 15 is provided in thermal contact with the temperature sensor. This is so constructed that a largely constant and, if necessary, also higher refrigerating output than that through the refrigerant line 14 itself is available.

Figure 4:
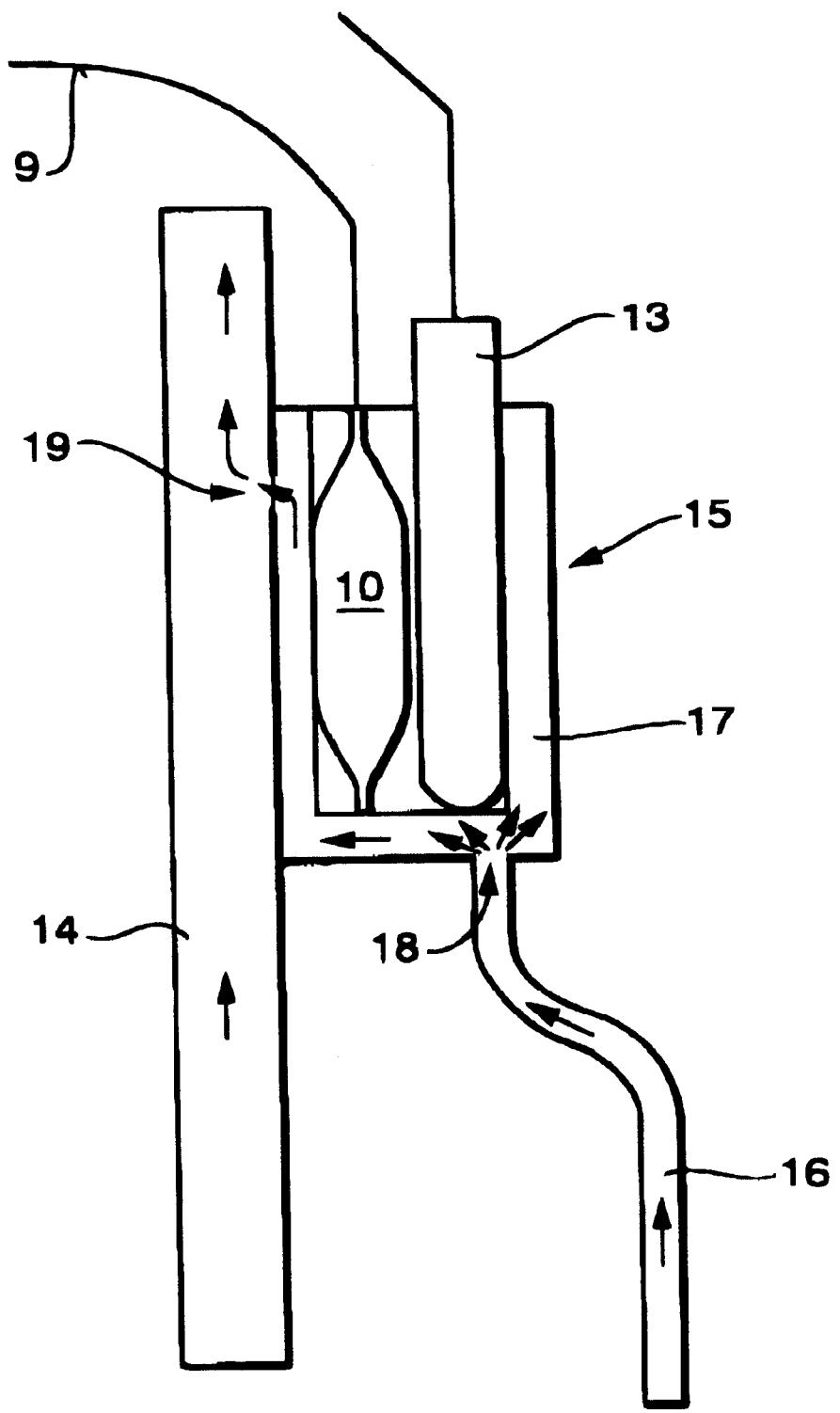
FIG. 4 shows a detailed view in the area of the refrigerating device of FIG. 3.

In the embodiment shown in FIGS. 3 and 4 the refrigerating device 15 is connected to the refrigerant cycle of the refrigerating unit 4. A capillary tube 16 is connected for this purpose to the refrigeration cycle of the refrigerating unit 4 with one end prior to the expansion valve 7 and with its other end connected to an evaporator 17 belonging to the refrigerating device 15.

As well recognized in FIG. 4, the evaporator 17 is constructed as a receiving container for the temperature sensor 10 and the heating unit 13. The outer boundary of the receiving container is at least partially constructed having double walls and the space bounded by the double wall forms the evaporator 17.

In the transition region 18 of the capillary tube 16 connected to the evaporator 17, an expansion region is formed for vaporizing the refrigerant supplied via the capillary tube.

From the evaporator 17, a return of the vaporized refrigerant occurs in the refrigerant line 14. For this purpose, a hole 19 is provided which penetrates the wall of the refrigerant line 14 and the wall of the evaporator 17 in the contact area.

The evaporator 17 constructed as a receiving container, as also well recognized in FIG. 4, is sealingly connected to the refrigerant line 14, so that upon breakdown of the refrigerating device 15, at least in most operating cases, a cooling through the refrigerant line 14 in thermal contact with the evaporator 17 and thus also with the temperature sensor 10 can always still occur. When the heating unit 13 breaks down, the regulation of the refrigerating output is thus maintained.

The individual parts in thermal contact with each other—especially the temperature sensor 10, heating unit 13 and refrigerating device 15—can be connected by heat conducting agents, for example a heat conducting paste or the like, in order to improve the heat conductivity.

I claim:

1. A laboratory thermostat (1) comprising a bath container (2) for a liquid (3) to be tempered, a refrigerating unit (4) for cooling the liquid comprising a refrigeration cycle having a compressor (5), a condenser (6), a first evaporator (8), and an expansion valve (7) serving as a mass flow regulator and controlled by a temperature sensor (10), a regulation device (11) connected to a temperature actual value sensor (12) for measuring a bath liquid temperature, and a tempering apparatus comprising a heating unit (13) controlled by the regulation device (11) and a refrigerating device (15) comprising a second evaporator (17) connected to the refrigeration cycle via a capillary tube (16), the tempering apparatus being in thermal contact with the temperature sensor (10) for increasing a refrigerating capacity of the refrigerating unit (4) by heating the temperature sensor (10) with heating unit (13) when the bath liquid temperature is higher than a bath target value temperature and for reducing the refrigerating capacity of the refrigerating unit (4) by cooling the temperature sensor (10) with the refrigerating device (15) when the bath liquid temperature is lower than the bath target value temperature.

2. The laboratory thermostat (1) according to claim 1, wherein the temperature sensor (10) is arranged at or after an outlet of the first evaporator (8).

3. The laboratory thermostat (1) according to claim 1, wherein the temperature sensor (10) is arranged after the outlet of the first evaporator (8) and in thermal contact with a refrigerant line (14) leading away from the first evaporator (8).

4. The laboratory thermostat (1) according to claim 3, wherein the second evaporator (17) is connected to the refrigeration cycle via a refrigerant return to the refrigerant line (14).

5. The laboratory thermostat (1) according to claim 4, wherein the refrigerant return is formed by a hole (19) penetrating a wall of the refrigerant line (14) and a wall of the second evaporator (17) in a contact area, and in a surrounding area of the hole the refrigerating device (15) is sealingly connected with the refrigerant line (14).

6. The laboratory thermostat (1) according to claim 1, wherein the heating unit (13) has one or more electrical heating elements.

7. The laboratory thermostat (1) according to claim 1, wherein the capillary tube (16) is connected to the refrigeration cycle before the expansion valve (7).

8. The laboratory thermostat (1) according to claim 1, wherein the temperature sensor (10) is in thermal contact with both the refrigerating device (15) and a refrigerant line (14) of the refrigeration cycle between the first evaporator (8) and the compressor (5).

9. The laboratory thermostat (1) according to claim 1, wherein the vaporizer (17) of the refrigerating device (15) is constructed as a receiving container for the temperature sensor (10) and the heating unit (13).

10. The laboratory thermostat (1) according to claim 9, wherein an outer boundary of the receiving container is constructed at least partially with a double wall, and a space bounded by the double wall forms the second evaporator (17).

11. The laboratory thermostat (1) according to claim 10, wherein in a transition region (18) of the capillary tube (16) connecting to the second evaporator (17) an expansion region is formed in the refrigerating device (15) for evaporating the refrigerant supplied via the capillary tube (16).

12. The laboratory thermostat (1) according to claim 1, wherein the expansion valve (7) is constructed as a membrane valve and is connected to the temperature sensor (10) constructed as a liquid thermometer via a control line (9) constructed as a tube for a control medium.

13. The laboratory thermostat (1) according to claim 1, further comprising a heating device (20) for heating the liquid (3).

* * * * *